July 2, 1946.　　　F. A. CARSTENS　　　2,403,049
METHOD OF MAKING CRANKSHAFTS BY ELECTRIC WELDING
Filed Aug. 31, 1942　　　2 Sheets-Sheet 1
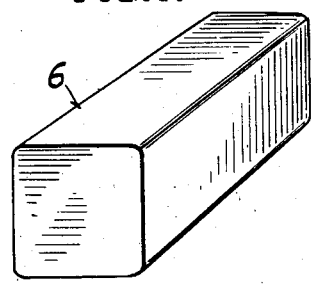
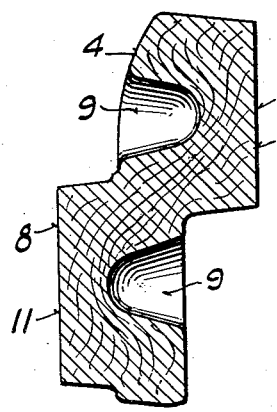
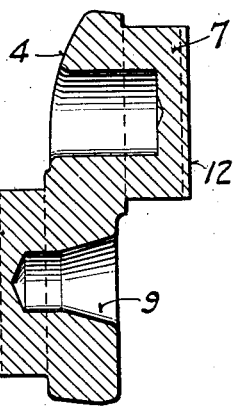
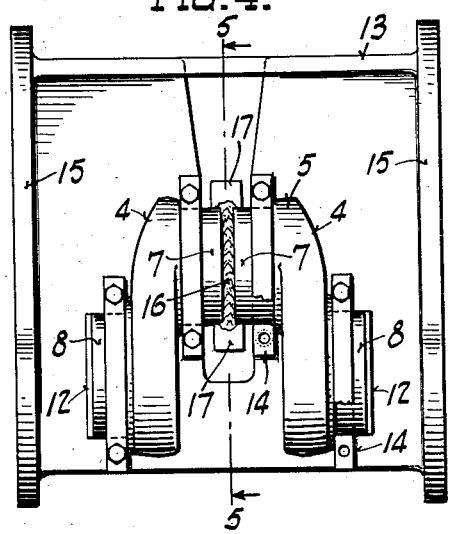
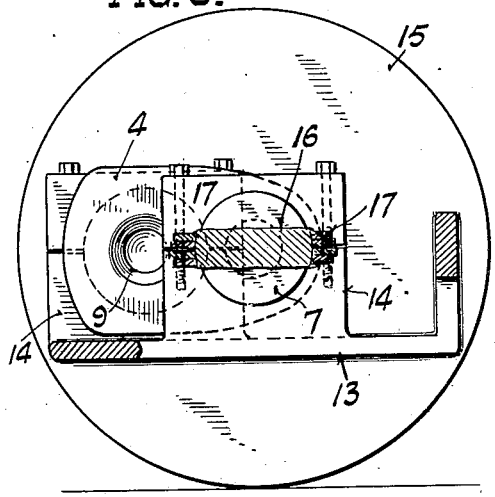
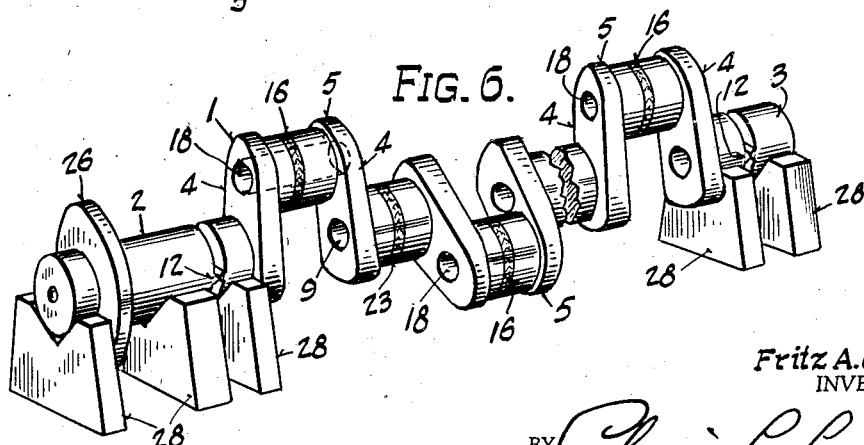
Fritz A. Carstens
INVENTOR.
BY
ATTORNEY.

July 2, 1946.　　　F. A. CARSTENS　　　2,403,049
METHOD OF MAKING CRANKSHAFTS BY ELECTRIC WELDING
Filed Aug. 31, 1942　　　2 Sheets-Sheet 2
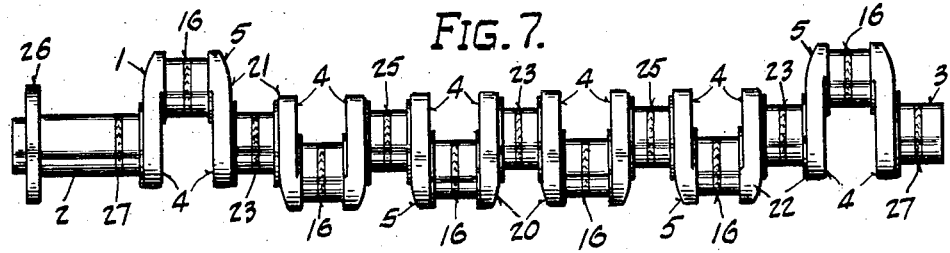
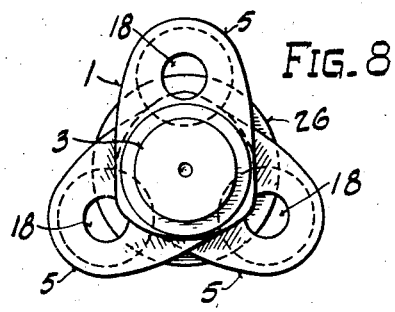
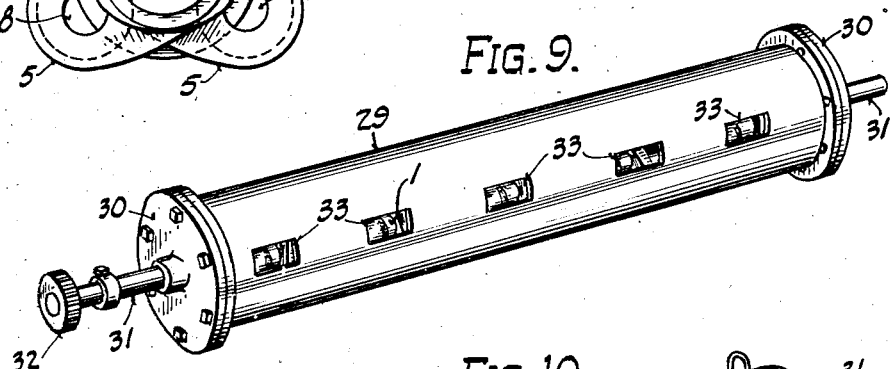
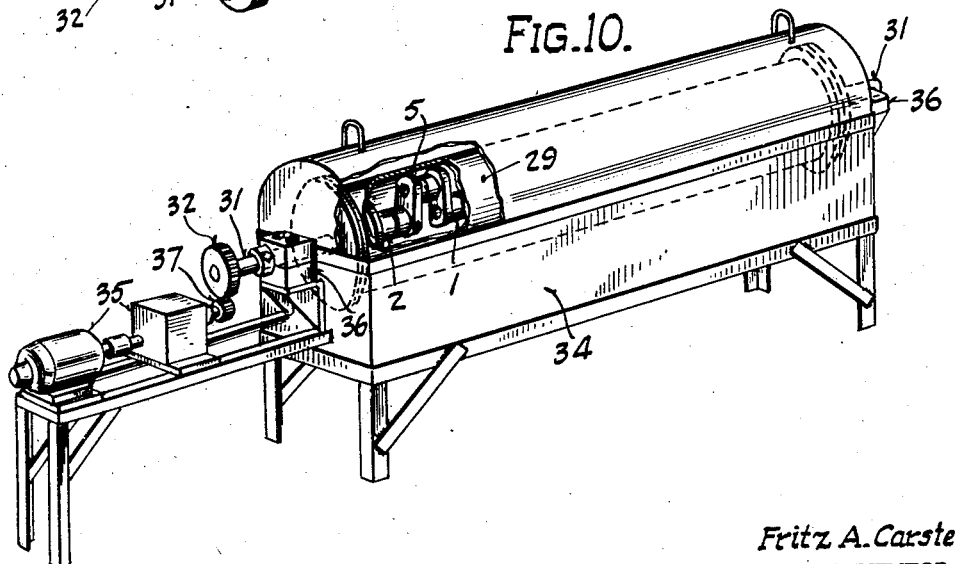
Fritz A. Carstens
INVENTOR.
BY
ATTORNEY.

Patented July 2, 1946

2,403,049

UNITED STATES PATENT OFFICE 2,403,049

METHOD OF MAKING CRANKSHAFTS BY ELECTRIC WELDING

Fritz A. Carstens, Milwaukee, Wis., assignor to A. O. Smith Corporation, Milwaukee, Wis., a corporation of New York Application August 31, 1942, Serial No. 456,783

3 Claims. (Cl. 29—6)

This invention relates to a method of making crankshafts by electric welding and the like.

One object of the invention is to provide a method of making crankshafts that eliminates excessive machining and reduces the waste of steel to a minimum.

Another object is to provide a method of making a crankshaft by welding a plurality of previously prepared forged sections together under which residual stresses in the welds are substantially removed during each welding operation to provide a completed crankshaft substantially free from distortion.

Another object is to provide a method of making a crankshaft that eliminates excessive straightening operations to thereby insure freedom from stresses caused by such operations.

Another object is to provide a method of heat-treating and stress-relieving a crankshaft and the parts thereof that provides an improved crankshaft without risk of distortion or warping beyond finish allowances.

Another object is to provide an improved method of making large diameter bearing members on a crankshaft.

A further object is to provide a method of heat-treating a crankshaft to enhance the physical properties thereof without distortion or warping of the same.

Another object is to provide a method of making durable, strong crankshafts with less costly machines, less skilled workmen and under mass production practices.

These and other objects will appear from the following description of an embodiment of the invention illustrated in the accompanying drawings.

In the drawings:

Figure 1 is a perspective view of the blank stock piece from which a single cheek unit of the crankshaft is forged;

Fig. 2 is a sectional view of a cheek unit as it appears after being forged;

Fig. 3 is a sectional view of a cheek unit after machining and heat-treatment;

Fig. 4 is a top plan view of a welding fixture in which two cheeks are assembled together and partially welded;

Fig. 5 is a section taken on line 5—5 of Fig. 4;

Fig. 6 is a perspective view of the crankshaft and the end pieces employed and showing the fixture to hold them during welding, part of the crankshaft being broken away;

Fig. 7 is a side elevation of a crankshaft to be stress-relieved by a final heat-treatment;

Fig. 8 is an end elevation of the crankshaft of Fig. 7;

Fig. 9 is a perspective view of the pipe-like fixture in which the crankshaft is confined during stress-relieving; and Fig. 10 is a schematic view of the stress-relieving furnace and showing a holding fixture disposed therein and carrying a crankshaft to be stress-relieved.

The invention generally involves separately heat-treating each individual basic unit of a crankshaft to increase its physical properties to substantially the maximum before the respective units are joined together. The method of joining the units permits this initial heat-treatment and the steel of the units retains the improved physical characteristics throughout the joinder and assembly operations. Final heat-treatment to obtain a high ultimate strength in the steel is not necessary. This fact, combined with the maintaining of machining operations at a minimum, substantially eliminates the risk of distortion and warpage which has been experienced in methods previously employed in fabricating large crankshafts.

The crankshaft 1 made by the method of the invention comprises generally the cylindrical end pieces 2 and 3 and the single cheek units 4. The cheeks are joined together in pairs to provide a single throw or double cheek 5. The throws are assembled together to form the main portions of the shaft.

In carrying out the method of the invention, the metal blank 6 illustrated in Fig. 1 is heated to forging temperature. The composition of the steel of blank 6 is comparable to that described in the application, Serial No. 456,782, filed on even date herewith by the present inventor and entitled: "Electric welded crankshaft."

The metal blank at forging temperature is then disposed between the dies of preferably a drop-forge and forged into a cheek 4, having a crank stub 7 and a journal stub 8. In this process axial indentations 9 are formed back of stubs 7 and 8.

The size, general shape and weight of the cheek unit lends itself to forging in drop hammers of approximately 12,000 pounds capacity. Other means of forging may, however, be employed. The dies of the drop-forge, not shown, as they form no part of this invention, are designed to provide the cheek 4 with the stubs 7 and 8 and indentations 9 above described.

The metal from indentations 9 in the forging operation is crowded by the forging dies into the stubs 7 and 8 to fill out the stubs and provide them with a substantially large diameter. Considerable material is thus saved to strengthen and enlarge the stubs which material would otherwise require removal by machining. The indentations 9 also provide a snake-like grain flow through the metal of the cheek that substantially increases the capacity of the same to resist stresses in operation.

The cheek unit 4 is next subjected to a heat-treatment that improves the physical properties of the same. In early tests of the invention, the cheek 4 was first heated to approximately 2200° F. which was above the highest critical temperature of the steel employed, and then held at such temperature for preferably two hours. This was followed by air-cooling by suitable means to below the lower critical temperature.

Thereafter the cheek 4 was reheated to a temperature such as 1625° F. and held at such temperature for approximately one hour. The temperature of the cheek was then lowered by liquid-quenching to substantially room temperature and then drawn at approximately 1300° F.

The heat-treatment of cheek 4 in the manner described with the composition of steel employed developed an ultimate tensile strength in the steel of 80,000 pounds per square inch and a yield strength of 50,000 pounds per square inch.

The edges of the cheek 4, after forging and heat-treatment, appear as illustrated in Fig. 2. To provide the cheek 4 illustrated in Fig. 3, the edges of the forged blank are premachined. The stubs 7 and 8 are turned down to the proper diameter and shoulder-faced, and in addition the indentations 9 are pre-bored without disturbing welding surfaces. The front face 10 of crank stub 7 and similar face 11 of journal stub 8 are scarfed by a suitable milling machine to provide a transverse lip 12 separating welding grooves when two cheeks 4 are assembled together.

Each cheek unit 4 was forged, individually heat-treated and machined in the manner described to provide cheek units of uniform strength and structure.

The next step in the method of the invention comprises joining two cheeks 4 together by their crank stubs 7 to provide the throw 5. In this operation, two cheek units 4 are assembled together and confined within a holding fixture 13 shown schematically in Fig. 4, with their crank stubs 7 opposed and the lip 12 on the face of one crank stub engaging the lip 12 on the face of the other crank stub.

The fixture 13 has accurately bored saddles 14 to properly locate the cheeks 4 therein and means such as large circular discs 15 disposed at the ends of the same to facilitate turning the fixture by rolling it on a flat surface.

The engaging lips 12 separate the space between the crank stubs 7 into two grooves and provide a base for the initial weld deposit that provides weld 16. Instead of providing two grooves as shown, it is possible to provide a circular groove with circular lips at the center forming the base of the same.

The welding operation is ordinarily performed by metallic electric arc welding by which weld metal 16 is deposited in the welding groove formed by the opposed assembled edges of adjoining crank stubs 7. The electrode employed is of an alloy composition that will provide a weld with physical properties similar to that of the cheek units 4 after heat-treatment of the units as described.

In making weld 16, a plurality of passes of weld metal, such as six passes of relatively thin deposit, are first laid in one welding groove. The holding fixture is then turned over, the underside of the lips 12 is cleaned by chipping and a similar number of passes are laid in on the other groove on the back side of the lips. The weld is completed by alternately welding in each groove until the grooves are filled. As the welding proceeds welding strips 17 are added at the ends of the grooves to provide dams for the weld metal deposits, the strips being cut off when the weld is completed.

This general procedure of welding is set forth in United States Patent No. 1,812,123 to Richard Stresau. However, in the present instance, the layers should be relatively thin, thereby avoiding heating a greater amount of the heat-treated parts than can be requenched by the colder adjacent metal. In most instances, it is advisable to preheat the cheeks before welding to assist in relieving stress.

The welding is interrupted from time to time to inspect the weld and check its soundness by X-ray. The weld metal is also generally peened after each pass to spread it outwardly and prevent injury to the joint by later shrinkage of the weld. The completed weld is cleaned by a rough turning operation.

By making a certain number of deposits in one welding groove and then in the opposite welding groove, a very uniform weld is provided. If the welding of one-half the stub were completed before the other half was worked on, the half-completed side would draw the edges of the welded groove towards each other and cause the gap of the other groove on the uncompleted side to widen. The widened gap would take more weld metal than the side worked on, thereby developing a weld of greater thickness on one side than the other, with consequent misalignment of the parts. Under the procedure of the present invention, the weld deposit is of substantially equal thickness throughout and the stresses are balanced and do not result in warpage or misalignment of the crankshaft.

The inside of the completed throw is next subjected to machining by a suitable annular cutter to provide a generally cylindrical longitudinally extending hole 18 through the crankpin bearing formed by joining the stubs 7 together and across the inner portion of weld 16. The indentations 9 forged into cheeks 4 eliminate excessive machining to obtain hole 18.

In the machining the cutter may be so operated that the center core of the crank bearing remains intact and can be removed to provide a test block for testing operations to ascertain the strength of the joint formed by joining two cheek units 4 together in the manner described.

The outside surface of the crankpin bearing is also machined and this combined with the inside machining thereof provides a bearing and weld with substantially uniform thickness and strength.

The next welding step consists in joining two crank throws 5 into a subassembly either in line as required for the two center cranks 20 or angularly offset such as the crank pairs 21 and 22. The crank pair 21 is preferably fabricated with the throws at a right-hand angular offset of 120° and the throws of the crank pair 22 are disposed at a left-hand angular offset of 120°. The angular offset of the cranks may vary, depending upon the design of the engine.

In the welding operation, which is substantially the same as that employed in welding two cheek units together, the journal stub 8 of one throw is welded to the journal stub 8 of another throw by welds 23. The holding fixture here employed is larger than holding fixture 13 previously described and generally similar to it in consideration. The welding procedure for the journal pins is substantially the same as that employed in making the crankpins. In making larger shafts it may be desirable to employ a circular groove in preference to the straight lip edges herein described.

The next welding step is accomplished by welding the previously-prepared crank pairs 20, 21 and 22 together into a six-throw crankshaft by welds 25. A suitable holding fixture similar to that first described but of larger size to accommodate more parts is employed to hold the assembled crank pairs. While thus confined, the journal stub 8 of crank pair 21 is welded to one of the journal stubs of center crank 20, and the journal stub of crank pair 22 is welded to the other free journal stub of center crank pair 20. The welding of the crank pairs together and the machining of the same are performed in the same manner as that employed in securing the crank stubs of two cheeks 4 together to provide a throw 5.

The final welding step comprises welding the end pieces 2 and 3 onto the ends of the assembled crank throws. The end pieces utilized are generally cylindrical and the end piece 2 at its outer end is provided with flange 26. The end pieces prior to welding are heat-treated in the same manner as the cheek units 4 to improve the physical properties of the pieces. The diameter of the main portions of the end pieces is substantially the same as that of the journal stubs 8. The end pieces are formed in any suitable manner prior to assembly with the crank throws.

The welds 27 are deposited between the end pieces and assembled throws by electric arc welding similar to that described in welding cheeks 4 into throws 5. The V-blocks 28 illustrated schematically in Fig. 6 hold the end blocks and the throw assembly in alignment for the depositing of welds 27.

Final machining operations are carried out on the crankshaft upon completion of the welding steps and thereafter the crankshaft is subjected to stress-relieving to relieve the stress introduced in the shaft while the same was being fabricated. It is important in this operation that the crankshaft be properly supported to prevent distortion due to its weight. To accomplish this, crankshaft I is preferably confined within the pipe-like fixture 29 illustrated in perspective in Fig. 9. The fixture or jig 29 has the contour and appearance of a substantially large pipe sufficient in size to completely confine the crankshaft I within the same.

The crankshaft is disposed within this fixture by inserting the shaft through one end thereof and then advancing the crankshaft until one end is located just inside one end of the fixture 29 and the other end is disposed just inside the other end of the fixture.

To insure that the crankshaft will maintain a proper position and to prevent harm thereto by injurious contact with the jig walls during the stress-relieving operation, the crankshaft is tack-welded or otherwise secured to the cylindrical wall of the jig. The opposite ends of the jig are then closed by the end plates 30 suitably secured to the outer edges of the wall of the fixture. The end plates are equipped with trunnions 31 and to one of the trunnions is secured the relatively small gear 32 for rotating the fixture as hereinafter described. The holes or slits 33 are provided in the wall of jig 29 to permit free circulation of hot air within the jig and in contact with the surface of crankshaft I.

The fixture and confined crankshaft are next disposed within a stress-relieving furnace 34 such as that illustrated schematically in Fig. 10. The furnace employed should be capable of producing a generally high temperature and be provided with a turnover drive 35 and bearings 36.

The trunnions 31 are disposed on bearings 36 and gear 32 of the jig meshed with pinion 37 of the drive 35. The fixture carrying the crankshaft I is constantly rotated during heating and the rotation maintains a constant circulation of hot air through the slits 33 in contact with crankshaft I. The rotation also provides cycles of recurrent stress reversals in the crankshaft so that warpage downwardly due to its weight is prevented.

In the stress-relieving treatment, the crankshaft is brought to just below its lower critical temperature such as 1200° F. and maintained at such temperature for a substantial length of time. Thereafter the crankshaft is gradually cooled down to room temperature. The treatment described substantially relieves all stress introduced into the crankshaft during its fabrication and yet does not injure the physical properties of the heat-treated steel.

After stress-relieving, the shaft is sand-blasted and inspected for defects. The bearing parts are turned into substantially perfect cylindrical shape by machining. Suitable holes are provided in the flanges of the respective throws and the heels of the throws are preferably milled. Other holes such as oil holes and counterweight holes may also be provided.

The invention provides a method of making a crankshaft that substantially eliminates the risk of distortion in fabrication. This is accomplished by improving the physical properties of the stock metal of the cheeks before any assembly of the cheek members occurs and then employing a method of welding such as electric arc welding, the heat of which can be so confined as not to destroy the prior heat-treating effect, to join the members by weld metal comparative in strength to that of the stock of the cheeks. The method of the invention also permits the use of the maximum tensile strength of the steel while holding the waste of metal to a minimum. In smaller crankshafts, instead of heat-treating the individual cheeks, it is possible to heat-treat the individual throws provided by the joinder of two cheeks together, and also to forge a throw from a single blank instead of forming it from two cheek members.

Various embodiments of the invention may be employed within the scope of the accompanying claims.

I claim:

1. In the manufacture of crankshafts for large Diesel engines and the like from separately forged and heat-treated parts, the steps of welding two cheek units together comprising providing a welding dam spacing the faces of corresponding pin stubs on the units and extending diametrically across the same to provide two substantially equal welding grooves, mounting the units in a fixture with said welding dam disposed horizontally, depositing a layer of weld metal in the groove above the dam from a metal arc welding electrode and fusing the same therewith and with the metal of the side walls of the groove by an electric arc established between said electrode and the parts being welded, rotating the fixture to present the other welding groove uppermost, cleaning the welding dam and similarly arc-depositing weld metal thereon in said second groove, alternately and similarly depositing additional layers of weld metal in the two grooves and providing end dams to retain the weld metal at the end edges of the grooves until the latter are completely filled, the weld metal being peened as successive deposits are cooled, and finally removing said last-named welding dams and machining the outer surface of the weld to constitute a part of the cylindrical surface of the pin.

2. In the manufacture of crankshafts for large Diesel engines and the like, the arc-welding of individual pieces together centrally across the crank-pins of the shaft, subsequently machining the outer surface of the welds to constitute a part of the cylindrical surface of the pins, and machining a core out of the center of the pin extending axially thereof.

3. In the manufacture of crankshafts for large Diesel engines and the like, the arc-welding of individual pieces together centrally across the pins of the shaft with the arc-deposited weld metal of substantially equal thickness throughout and balanced in its contraction substantially equally on the opposite sides of the pins.

FRITZ A. CARSTENS.